(No Model.)
J. NOBLE.
PLUMBER'S FITTING.
No. 334,542. Patented Jan. 19, 1886.
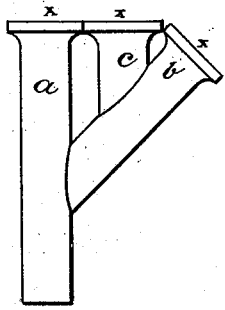
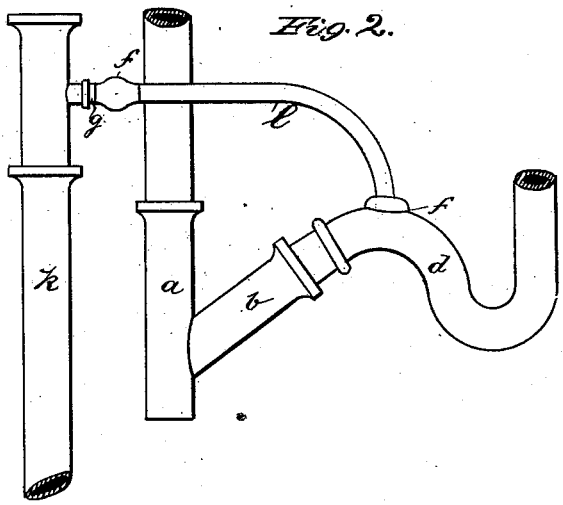
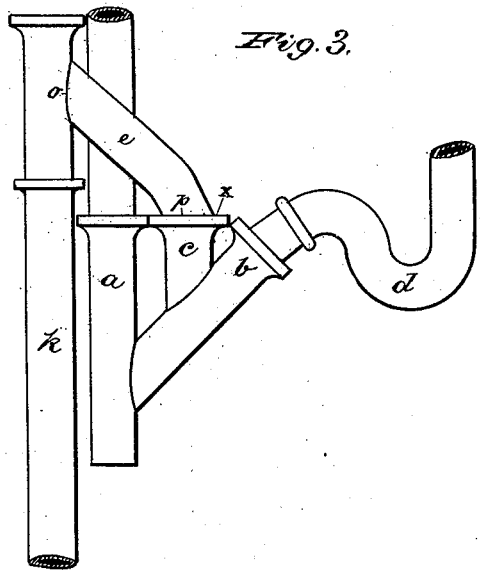
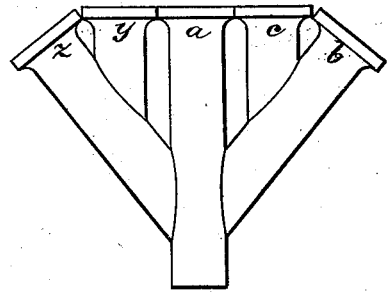
Witnesses:
Nathan L. Hahn.
James McArdle.
Inventor:
James Noble

UNITED STATES PATENT OFFICE.

JAMES NOBLE, OF NEW YORK, N. Y.

PLUMBER'S FITTING.

SPECIFICATION forming part of Letters Patent No. 334,542, dated January 19, 1886.

Application filed June 14, 1884. Serial No. 134,814. (No model.)

*To all whom it may concern:*

Be it known that I, JAMES NOBLE, a citizen of the United States, residing in the city of New York, in the county and State of New York, have invented a new and useful Improvement in Plumbers' Fittings, of which the following is a specification.

Heretofore fittings of a kindred character have been made with but two arms for use with any one fixture, one arm being used to connect the waste-pipe with the fitting and the other arm to connect the trap or other connection leading to the fixture (such as a sink, closet, &c.) with the fitting. The connection of the trap with the vent-pipe has thus been left to an extra piece of lead pipe or connection. This involves the use of solder joints at the ends of this extra lead connection and of a brass or copper ferrule at the end of said connection, which unites with the iron bent pipe. This is more expensive in both material and work, and has less strength than my fitting. The lead connection also is liable to be cut or bent, or eaten through by rats; also, the lead connection cannot properly be laid or set at the time when the stronger iron pipes may be laid, (which is usually when the building is less complete and more open, affording better access for work,) because other work is apt to damage the lead connection. Thus more expense is incurred. As at present laid, also, the pipes occupy more space and material for casing, involving greater expense, and especially the lead connection is properly of a smaller diameter than the iron pipes and connections, (to afford good base for the lead connection at its ends,) and therefore the ventilating-space is restricted. This militates directly against the object of the sanitary portion of the pipes.

My invention covers all of these defects, and relates to the fittings of sanitary and useful plumbing, in which there are connections with waste and vent pipes, and with traps or other connections with fixtures, by means of three or more arms in the fitting, (which arms may be angular or curved;) and the objects of my improvements are, first, to afford facilities for connections to be made of iron instead of lead pipe; second, to dispense with some solder joints; third, to dispense with one or more brass or copper ferrules; fourth, to enable the entire system of pipes to be laid at one time; fifth, to enable the pipes to be laid more compactly than at present; and, sixth, to furnish better ventilating facilities. I attain these objects by a fitting illustrated in the accompanying drawings, in which—

Figure 1 is a face view of my fitting with three arms. Fig. 2 is a face view of a fitting of the present form, and showing connections with main vent or ventilating pipe, and with trap or other connection with fixture. Fig. 3 is a face view of my fitting with connections corresponding to those shown in Fig. 2; and Fig. 4 is a face view of my fitting with five arms, to connect with fixtures on both sides.

Similar letters refer to similar parts throughout the several views.

In Fig. 1 the fitting is a half-Y joint having the arms $a$ and $b$, and a half-Y joint having the arms $c$ and $b$, all in a single casting. The angles of these arms may be various, or the arms may be curved in different fittings; but it is preferable to so arrange them that the hubs $x\ x$ will be united and the whole fitting compact.

In Fig. 2 the fitting is a half-Y joint having the two arms only, $a$ and $b$.

The solder joints $f\ f$ and the brass or copper ferrule $g$ are necessary to unite the lead connection $l$ with the main vent or ventilating pipe $k$, and with the trap or other connection with fixture $d$, and thus connect the trap and the vent.

In Fig. 3, by means of the arm $c$, having the hub $x$, the connection of the trap $d$ with the vent $k$ is made by the iron pipe or connection $e$, the connection at point $p$ being made by molten lead and the connection at point $o$ being made by a continuation of $e$, which is a cast fitting now in use. Thus the solder joints $f\ f$ and the brass or copper ferrule $g$ (see Fig. 2) are all dispensed with.

It is apparent, also, from the drawings, as herein described, that by the use of my fitting the whole system of pipes may be laid at one time and more compactly, and better ventilating-space and direction be obtained than by the old methods.

What I claim as my invention, and desire to secure by Letters Patent, is—

5   A plumber's fitting provided with three or more arms constructed and arranged to permit iron-pipe connections with the waste-pipe, vent-pipe, and trap, substantially as set forth.

JAMES NOBLE.

Witnesses:
NATHAN L. HAHN,
JAMES MCARDLE.